US006182927B1

(12) United States Patent
Galvin

(10) Patent No.: US 6,182,927 B1
(45) Date of Patent: Feb. 6, 2001

(54) MEDIUM EARTH ORBIT AUGMENTATION OF A GLOBAL POSITIONING SYSTEM FOR GLOBAL NAVIGATION

(75) Inventor: Dennis M. Galvin, Huntington Beach, CA (US)

(73) Assignee: The Boeing Company, Seattle, WA (US)

(*) Notice: Under 35 U.S.C. 154(b), the term of this patent shall be extended for 0 days.

(21) Appl. No.: 09/159,740

(22) Filed: Sep. 24, 1998

(51) Int. Cl.[7] ........................................... B64G 1/10
(52) U.S. Cl. .................... 244/158 R; 455/12.1; 455/13.1; 342/352; 342/357
(58) Field of Search ............... 244/158 R; 455/12.1, 455/13.1, 13.2; 342/352, 357

(56) References Cited

U.S. PATENT DOCUMENTS

| | | | |
|---|---|---|---|
| 4,809,935 | 3/1989 | Draim | 244/158 R |
| 4,854,527 | 8/1989 | Draim | 244/158 R |
| 5,326,054 | 7/1994 | Turner | 244/158 R |
| 5,415,367 | 5/1995 | Horstein et al. | 244/158 R |
| 5,415,368 | 5/1995 | Horstein et al. | 244/158 R |
| 5,433,726 | 7/1995 | Horstein et al. | 244/158 R |
| 5,439,190 | 8/1995 | Horstein et al. | 244/158 R |
| 5,551,624 | 9/1996 | Horstein et al. | 244/158 R |
| 5,582,367 | 12/1996 | Costiel et al. | 244/158 R |
| 5,669,585 | 9/1997 | Costiel et al. | 244/158 R |
| 5,788,187 | 8/1998 | Costiel et al. | 244/158 R |
| 5,871,181 * | 2/1999 | Mass | 244/158 R |
| 5,890,679 * | 4/1999 | Chethik | 244/158 R |
| 5,906,337 * | 5/1999 | Williams et al. | 244/158 R |
| 6,032,902 * | 3/2000 | Palmade et al. | 244/158 R |
| 6,050,525 * | 4/2000 | Drake | 244/158 R |

OTHER PUBLICATIONS

Parkinson, Bradford W. et al. "Global Positioning System: Theory and Applications" Progress in Astronautics and Aeronautics, 1995 vol. 163, p. 187, Published by The American Institute of Aeronautics and Astronautics, Inc., Washington, D.C. 20024–2518.

Pullen, Same et al. Optional Augmentation of GPS Using Inexpensive Geosynchronous Navigation Satellites, Proceedings Of The Institute of Navigation GPS–97, Sep. 16, 1997, pp. 1271–1281.

Pedro, Pablos A. et al, "European Constellation Contribution to GNSS", Proceedings of The Institute of Navigation GPS–97, Sep. 16, 1997, pp. 1261–1269.

Kinal, George V. et al, "Performance of The Inmarsat—3 Navigation Augmentation Payloads", Proceedings of The Institute of Navigation GPS–97, Sep. 16, 1997, pp. 1285–1294.

Milliken, Robert J., "Principle of Operation of NAVSTAR and System Characteristics", The Institute of Navigation, 1980 vol. 1, pp. 4–1 to 4–12.

Perotta G et al: "GNSS2 System Requirements Suitability for Several Satellite Constellations" Nov. 5, 1996, NAV 96. Global Navigation Systems—Where We Are Now. 1996 International Conference, Proceedings of 1st European Global Navigation Satellite Systems Conference, London, UK, Nov. 5–6, 1996, UK, Royal Inst. Navigation, UK, pp. 1–18.

Leung J S et al., "GPS Standard Positioning Service (SPS) Aircraft En Route Raim Availability For Continental United States" Nov. 5, 1995, Digital Avionics Systems Conference (DASC), us, New York, NY: IEEE, vol. Conf. 14, pp. 245–251.

* cited by examiner

Primary Examiner—J. Woodrow Eldred
(74) Attorney, Agent, or Firm—Brooks & Kushman, P.C.

(57) ABSTRACT

A satellite navigation system and method for improving overall navigation accuracy when used in conjunction with the existing Global Positioning System. At least twelve satellites reside in a plurality of medium earth orbits, each orbit having a period of at least three sidereal hours and less than one sidereal day, and an inclination angle between 35 and 75 degrees or between 105 and 145 degrees. The satellites are positioned within their orbits such that the vertical navigation accuracy provided by the system is at least 7.6 meters with at least 99.9% availability.

16 Claims, 8 Drawing Sheets

VERTICAL DILUTION OF PRECISION (VDOP)
OVER THE CONTINENTAL UNITED STATES FOR GPS SATELLITES

MEDIUM EARTH ORBIT AUGMENTATION OF A GLOBAL POSITIONING SYSTEM FOR GLOBAL NAVIGATION

BACKGROUND OF THE INVENTION

1. Technical Field

The present invention relates to earth orbit satellite navigation systems and methods for augmenting the existing Global Positioning System in order to optimize navigation accuracy.

2. Background Art

The United States of America Department of Defense Global Positioning System (GPS) has revolutionized the manner in which the world navigates. The baseline constellation of 24 GPS satellites in six orbital planes, each orbit having four satellites per plane, provides accurate and reliable signals from earth orbiting satellites so that anyone using a GPS receiver can determine their position to within 100 meters horizontal and 150 meters vertical accuracy anywhere on earth at any time. The U.S. military can determine position to within 16 meters using properly keyed receivers. While the availability of GPS accuracy has changed the manner in which the world navigates today, the accuracy is not sufficient to meet certain aviation navigation needs.

Aviation navigation requires improvements in three areas of GPS performance: accuracy, integrity, and continuity. Aviation is dependent on very accurate navigation, especially during the landing phase of flight under conditions of reduced visibility. An airplane landing in a Category I precision approach (an instrument approach to a vertical decision height of not less than 200 feet with at least ½ mile horizontal visibility, or the runway's operative touchdown zone and runway centerline lights visible) cannot tolerate a 150 meter vertical error offered by the existing GPS. The vertical accuracy requirement for a Category I precision approach is 7.6 meters. The vertical dimension is the most difficult to determine using satellite navigation due to the relative positioning of the satellites to the aviation user. In addition to improvements in accuracy, aviation users must also trust in the correctness of the data being broadcast from the satellites. This trust is known as signal integrity and requires that the user have timely knowledge of satellites that are transmitting erroneous data so that the user can ignore the corrupted signals. The third requirement for aviation users is for a high assurance of continuity of service. For aviation users to depend solely on a GPS augmentation system there must be a very high degree of reliability to support aircraft that are in-flight.

To increase overall system accuracy, additional satellites are needed to augment the current constellation of GPS satellites. Articles by Kinal, "Performance of the INMARSAT-3 Navigation Augmentation Payloads", 1997, by Pedro, "European Constellation Contribution to GNSS", 1997, and by Pullen, "Optimal Augmentation of GPS using Inexpensive Geosynchronous Navigation Satellites", 1997, describe the current approach of placing augmentation satellites in geostationary earth orbits (GEO) over specific geographic regions of the earth. While this approach provides a regional improvement in the navigational accuracy, it has limited global potential due to the lack of available GEO orbit slots and the low viewing angle of GEO satellites at higher latitudes.

The compilation "Global Positioning System: Theory and Applications Volume 1", 1995, edited by Parkinson and Spilker, describes several methods for augmenting the existing GPS. The first method of augmentation is to add one satellite to each of the six GPS orbital planes. The second method is to add augmentation satellites at the GPS orbit altitude in the plane of the equator. The third method is to add augmentation satellites in geostationary orbits. The fourth method of augmentation is to add satellites in inclined orbits below the GPS orbital altitude. All of these methods are designed to increase the minimum number of satellites in view to improve the receiver tolerance to single-satellite outages. While adding one satellite in view may provide the user with a general improvement in navigational accuracy, none of the four methods described improve the vertical accuracy to the degree necessary for a Category I precision approach.

Several U.S. Patents have been issued for satellite systems that provide regional or global coverage. U.S. Pat. Nos. 4,809,935 and 4,854,527 issued to Draim define orbits which require the minimum number of satellites to maintain one satellite in view from the Northern Hemisphere, the Southern Hemisphere, or both simultaneously. U.S. Pat. Nos. 5,551,624 and 5,433,726 and 5,439,190 and 5,415,368 and 5,415,367 issued to Horstein et al. define satellite communication systems which minimizes propagation time delays, the number of beam-to-beam handovers, and the number of satellite-to-satellite handovers. U.S. Pat. Nos. 5,582,367 and 5,669,585 issued to Castiel et al. describe elliptical orbits which provide preferential satellite coverage based upon geographical location, time of day, or offset from the sun. U.S. Pat. No. 5,788,187 also issued to Castiel et al. describes the placement between satellites and the earth stations they are communicating with so as to avoid the line-of-sight to geostationary satellites. Finally, U.S. Pat. Nos. 5,326,054 issued to Turner defines elliptical orbits which reach apogee over a given longitude five or six times per day. Each of these patents generally concern satellite communication systems where the purpose is to maintain one satellite visible somewhere in the sky to permit point-to-point communications. As a result, these patents fail to resolve the need for improving the navigation accuracy to permit a Category I precision approach.

SUMMARY OF THE INVENTION

Accordingly, the principle object of this invention is to provide an earth orbit satellite navigation system and method for augmenting the existing Global Positioning System (GPS) in order to optimize navigational accuracy.

According to the present invention then, a satellite navigation system is provided, which is designed for use with the GPS to improve overall navigation accuracy. The present invention augments the 24 satellites of the GPS with at least 12 augmentation satellites residing in a plurality of medium earth orbits. The augmentation satellites transmit navigation signals to users. The augmentation satellite orbits have periods between three sidereal hours and twenty four sidereal hours (one sidereal day), and inclination angles between 35 and 75 degrees or between 105 and 145 degrees. The augmentation satellites are positioned within their orbits so that the combination of navigation signals broadcast from the 24 GPS satellites and the navigation signals broadcast from the augmentation satellites provide users with a vertical navigation accuracy of at least 7.6 meters at least 99.9% of the time.

The present invention also provides a method to supplement the existing Global Positioning System with augmentation satellites to improve overall navigation accuracy. The method launches at least 12 augmentation satellites into a plurality of medium earth orbits. From orbit the augmentation satellites transmit navigation signals to users. The augmentation satellite orbits have periods between three sidereal hours and twenty four sidereal hours (one sidereal day), and inclination angles between 35 degrees and 75 degrees or between 105 degrees and 145 degrees. The augmentation satellites are positioned within their orbits so that the combination of navigation signals broadcast from the 24 GPS satellites and the navigation signals broadcast from the augmentation satellites provide users with a vertical navigation accuracy of at least 7.6 meters at least 99.9% of the time.

These and other objects, features and advantages will be readily apparent upon consideration of the following detailed description in conjunction with the accompanying drawings.

DETAILED DESCRIPTION OF THE PREFERRED EMBODIMENT

In general, the present invention is a satellite-based navigation augmentation system and method employing a constellation of navigation satellites in medium earth orbit. The augmentation satellites transmit navigation signals which, when combined with the navigation signals transmitted from the existing Global Positioning System (GPS) satellites, provide for a navigation capability that meets the requirements of all phases of flight down to a Category I precision approach with a minimum of satellites.

As is well known in the art, the GPS is composed of four satellites in each of six orbital planes for a total of 24 satellites. The satellites are at an altitude of approximately 20,183 kilometers (10,898 nautical miles) so that they circle the earth once every 12 sidereal hours. Each orbital plane is inclined 55 degrees with respect to the equator to provide reasonable elevation angles to the users at high latitudes. The right ascension of ascending node for the six orbital planes are separated by 60 degrees to provide global coverage.

Referring now to FIGS. 1–11, the preferred embodiment of the present invention will now be described in greater detail.

Figure 1:
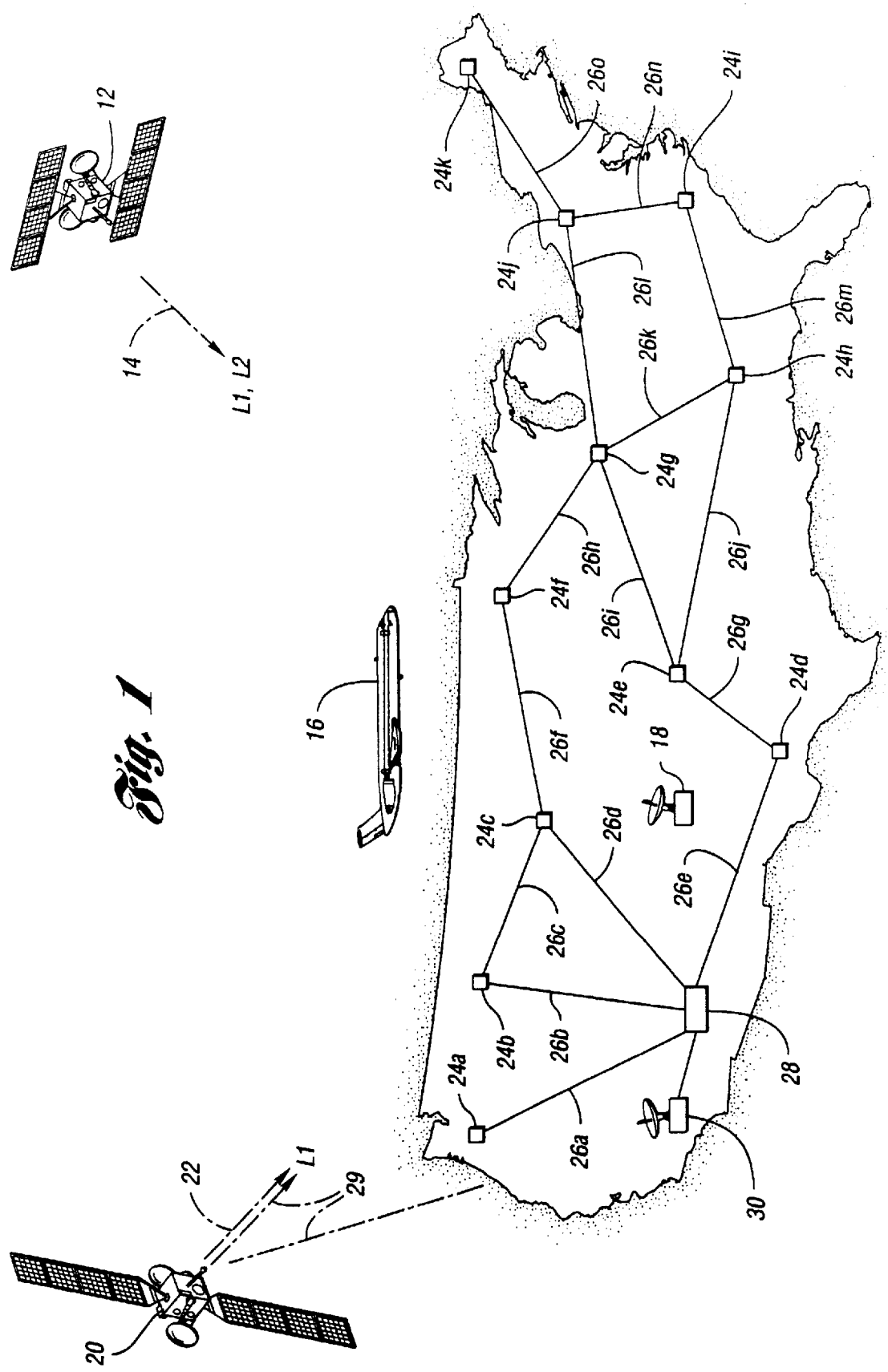
FIG. 1 is an illustration of the augmentation satellite-based navigation system for global aviation of the present invention.

FIG. 1 is an illustration of the global satellite-based augmented system as intended for use by aircraft. As seen therein, the GPS provides 24 satellites 12 in earth orbit. The GPS satellites 12 have conventional support systems such as power, attitude control, propulsion, thermal control, communication, and payload. The primary payload on a GPS satellite 12 is the navigation payload with its associated atomic clock. The navigation payload broadcasts navigation signals 14 on two separate L band frequencies, L1 at 1575.42 MHZ and L2 at 1227.6 MHZ. The civilian users 16 navigate from the signals broadcast on the L1 frequency. The signals broadcast on the L2 provide greater accuracy but are encrypted for military use only. These navigation signals are broadcast continuously, with very infrequent interruption for maintenance on one satellite at a time. The GPS satellites 12 are monitored by five ground stations (not shown) throughout the world (Hawaii, Colorado Springs, Ascension Island, Diego Garcia and Kwajalein Island). Corrections are made to data in the GPS satellites 12 at periodic intervals by sending commands up to the satellites 12 from ground antenna 18. The GPS ground stations and satellites 12 are the responsibility of the Department of Defense and are controlled independent of any augmentation system.

The navigation augmentation systems operation is similar to that of the GPS. The augmentation satellites 20 transmit navigation signals 22 continuously on the L1 frequency and other civilian frequencies. Corrections for variations in the GPS satellite 12 and augmentation satellite 20 positions and clocks are accomplished substantially continuously through a series of wide area reference stations 24a–24k which monitor the navigation signals and relay them over terrestrial communication links 26a–26o to a wide area monitor station 28 for processing. In addition to monitoring the satellites, the wide area reference stations 24a–24k also receive the L2 carrier (known as codeless L2) from which ionospheric induced errors are determined. Correction data 29 for the GPS satellite 12 positions and clocks, the augmentation satellite 20 position and clocks, and ionospheric induced errors are transmitted back to the augmentation satellites 20 from a ground uplink station 30. The augmentation satellites 20 then transmit correction data 29 to the user 16.

Figure 2:
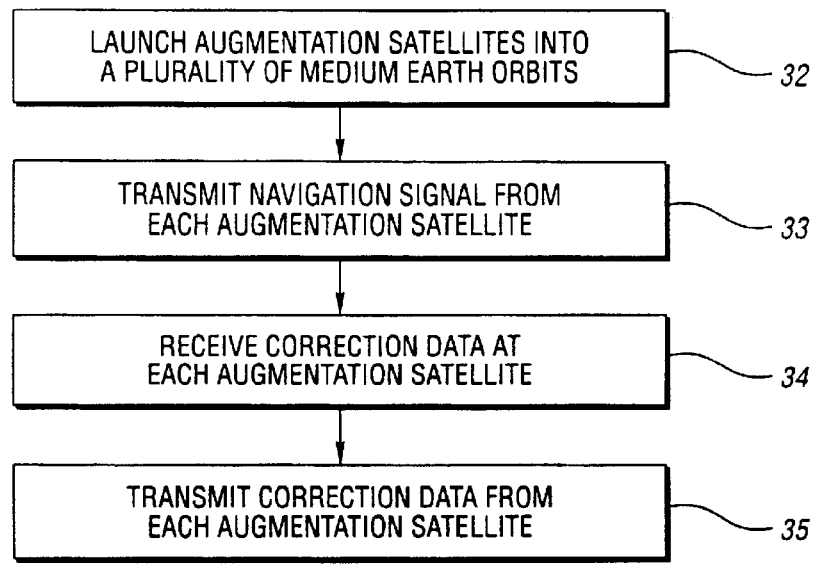
FIG. 2 is a flow diagram of the method of the present invention.

FIG. 2 shows the process for establishing the augmentation satellite system. The augmentation satellites are first launched 32 into multiple medium earth orbits. Once in orbit, each augmentation satellite transmits a navigation signal 33. After correction data is received from a ground link station 34, each augmentation satellite transmits the correction data to the users 35.

Referring again to FIG. 1, to determine position in three-dimensional space a user 16 must receive multiple navigation signals 14, 22 from any combination of GPS satellites 12 and/or augmentation satellites 20. Each navigation signal 14, 22 contains the satellite's 12, 20 ephemerides and the time. The position of the user 16 is unknown and is expressed as the variables x, y, and z. With three unknowns, the user 16 needs to receive a navigation signal 14, 20 from three known independent sources, namely three satellites 12, 20. The parameters that are known from each satellite 12, 20 are the x, y, and z coordinates of each satellite 12, 20, and the range from the user 16 to each satellite 12, 20. Because the user 16 does not have an accurate atomic clock, as available on each satellite 12, 20, the range computed from the user 16 to each satellite 12, 20 contains the user's 16 receiver clock error. This computed range is known as pseudorange. The user's 16 clock error introduces a fourth unknown into the user's 16 position computation. Solving for this fourth unknown requires another (fourth) independent equation. As a result, at least four satellites 12, 20 are needed when determining a position fix. If more satellites 12, 20 are viewable by the user 16 then a more accurate position fix will be realized by the user 16.

The accuracy of the user's position as determine from the navigation signals is described by the Geometric Dilution of Precision (GDOP). The GDOP generally assumes that the measured ranging and timing errors are independent with zero mean, and that all measurement errors have the same root mean square value for σ. GDOP for three dimensions plus time is defined in equation 1 as, $$GDOP = (\sigma_x^2 + \sigma_y^2 + \sigma_z^2 + \sigma_b^2)^{1/2}/\sigma \qquad (1)$$

wherein o is the statistical root mean square error for range measurements, $\sigma_x$, $\sigma_y$, and $\sigma_z$ are the root mean square errors in the estimated user position coordinates x, y, and z, and the user clock bias error estimate has a root mean square value of $\sigma_b$ expressed in distance units.

The vertical contribution to the GDOP is the Vertical Dilution of Precision (VDOP). VDOP is defined in equation 2 as, $$VDOP = \sigma_{zz}^2 \qquad (2)$$

where $\sigma_{zz}^2$ is the zz diagonal of the user covariance matrix.

Using the VDOP, the Vertical Accuracy ($V_A$) is defined in equation 3 as, $$V_A = 2*VDOP*UERE \qquad (3)$$

where UERE is the User Equivalent Range Error, which is a measure of a composite of system elements including the satellite, ground system, atmospheric propagation variances, and user equipment errors, and where 2 is the second standard deviation or 95% confidence level. The UERE may be assumed to be nearly constant for a given navigation system architecture and system component performance. A conservative value for a navigation system UERE is 1.5 meters. This value will be somewhat lower for high user-to-satellite elevation angles, and will be somewhat higher as these elevation angles become lower and closer to the local horizon. Using the assumption of a constant UERE, the vertical accuracy depends only upon the VDOP.

Figure 3:
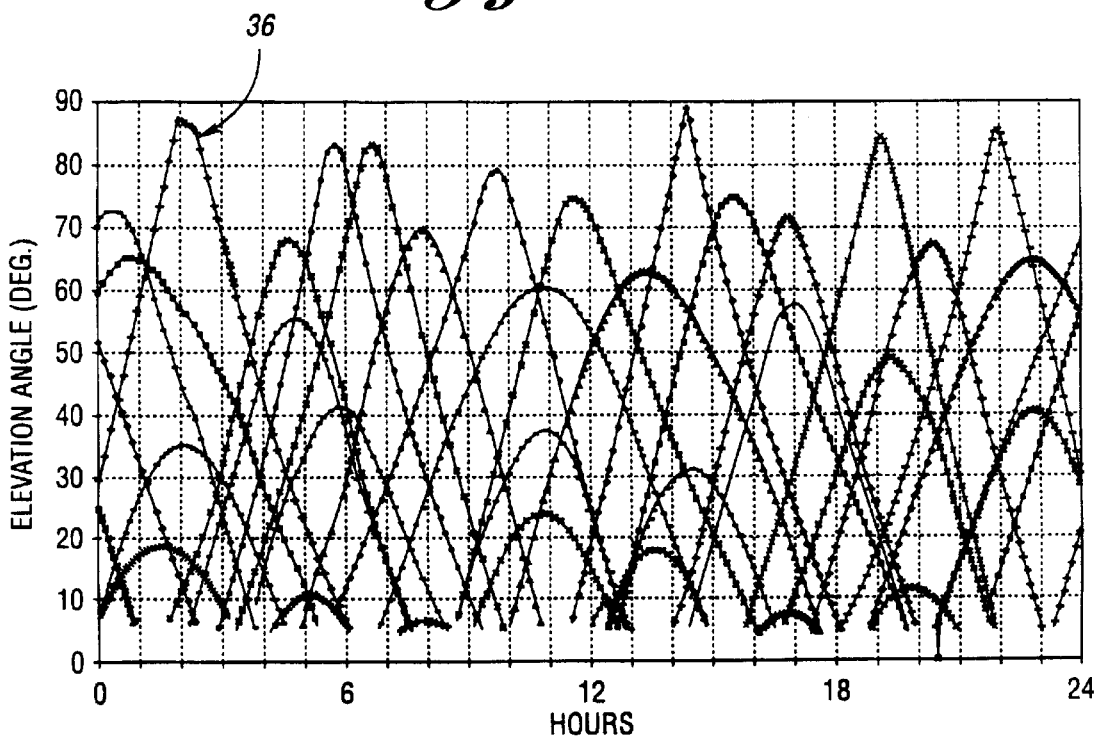
FIG. 3 is a plot of the elevation angles from an aviation user at Los Angeles International airport to all Global Positioning System satellites in view during one complete sidereal day.

FIG. 3 shows how the vertical component of the GPS satellite geometry varies over time from a users point of view. The curves 36 plot the elevation angles from an aircraft at Los Angeles International airport to all of the viewable GPS satellites over a 24 hour period. The figure shows that the elevation angle to the highest GPS satellite in the sky at any given time varies significantly over the course of one day.

Figure 4:
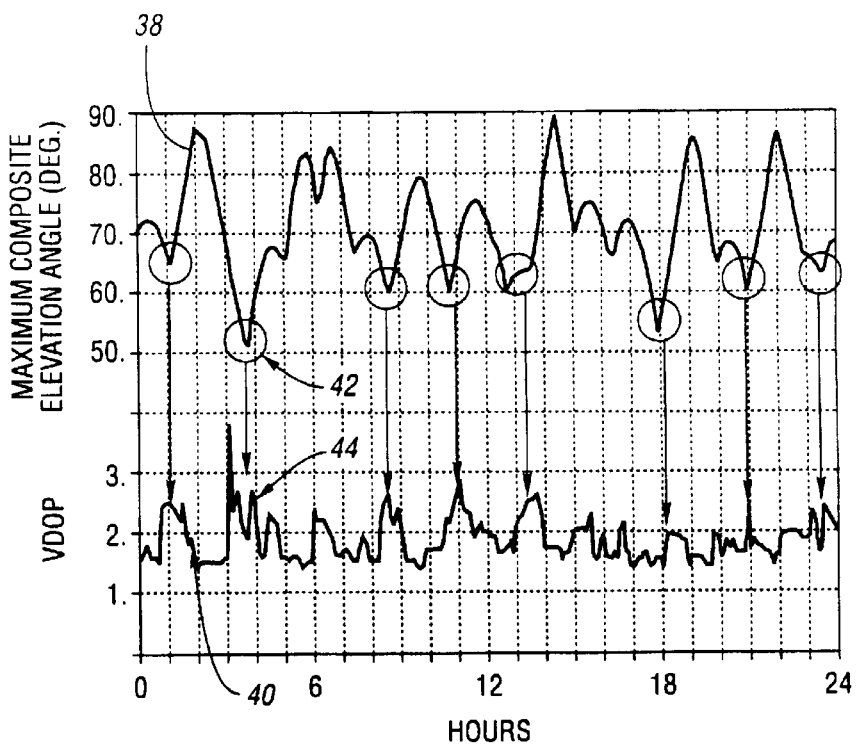
FIG. 4 is a plot of the maximum composite elevation angles and Vertical Dilution Of Precision, based upon the data from FIG. 3.

FIG. 4 shows the relationship between the satellite elevation angle and the VDOP. The upper trace 38 is the maximum composite elevation angle for all of the GPS satellites from FIG. 3. The lower trace 40 is the VDOP for the aircraft from FIG. 3. The two traces show the relationship between low satellite elevation angles 42 and high VDOP 44 leading to degraded vertical accuracies at these times. The purpose of the augmentation satellites is to reduce or eliminate these time periods where the user-to-satellite composite elevation angles contribute to high VDOP.

Figure 5:
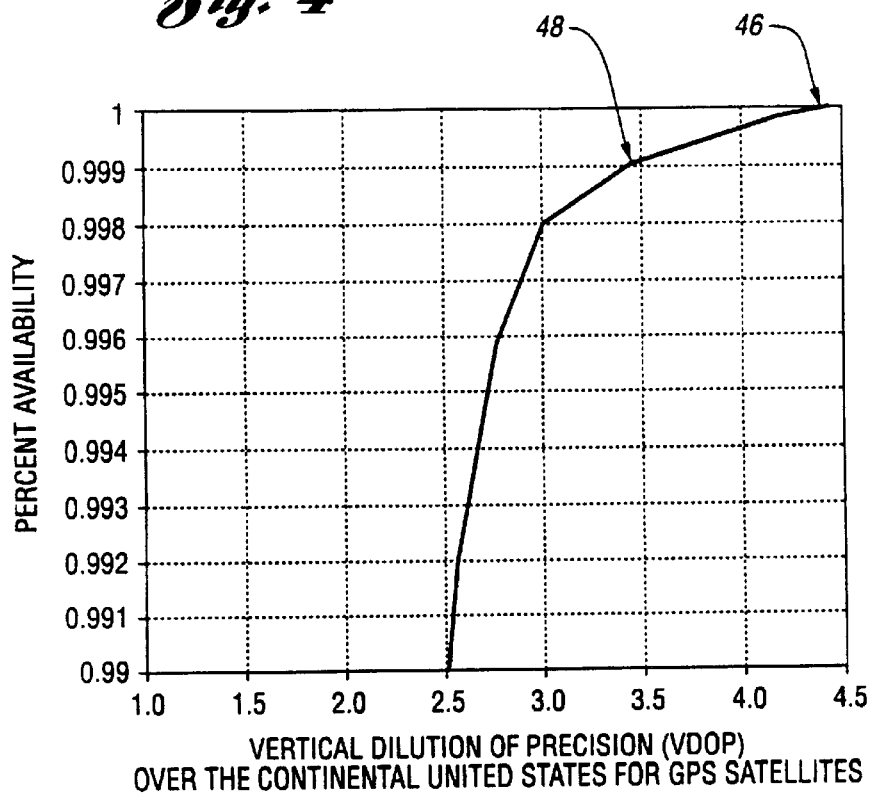
FIG. 5 is a plot of the percent availability of the Vertical Dilution Of Precision in the continental United States of America.

The smallest value of VDOP yields the smallest vertical error in equation (3). The orbit parameters that yield the smallest VDOP, however, cannot be determined in a closed form solution. To find the minimum VDOP, a numerical integration process is used. To accomplish this, VDOP is measured at all geographic areas in all global air spaces, or in geographic areas of interest and their air spaces, for all GPS satellites and all augmentation satellites over a complete sidereal day. The result of the integration process provides a measurement of the amount of time that specific values of VDOP are realized. An example of this time measurement is shown in FIG. 5, which is for the 24 satellite GPS constellation. The data are taken at points at five degree increments within the United States of America National Airspace System at six minute intervals over a one sidereal day period. This represents 18,720 data points for which VDOP is calculated for all satellites in view. The cumulative data results show that 100% of the time the VDOP 46 is equal to or less than 4.4 for the 24 GPS constellation only.

As previously discussed, the required availability for precision approach Category I is 0.999. From FIG. 5 the curve intersects 0.999 availability at a VDOP 48 of approximately 3.4. Referring to equation (3), a VDOP of 3.4 yields a vertical accuracy of 10.2 meters, thus the 24 GPS satellites alone do not meet the aviation requirement of 7.6 meters for Category I vertical accuracy.

Figure 6:
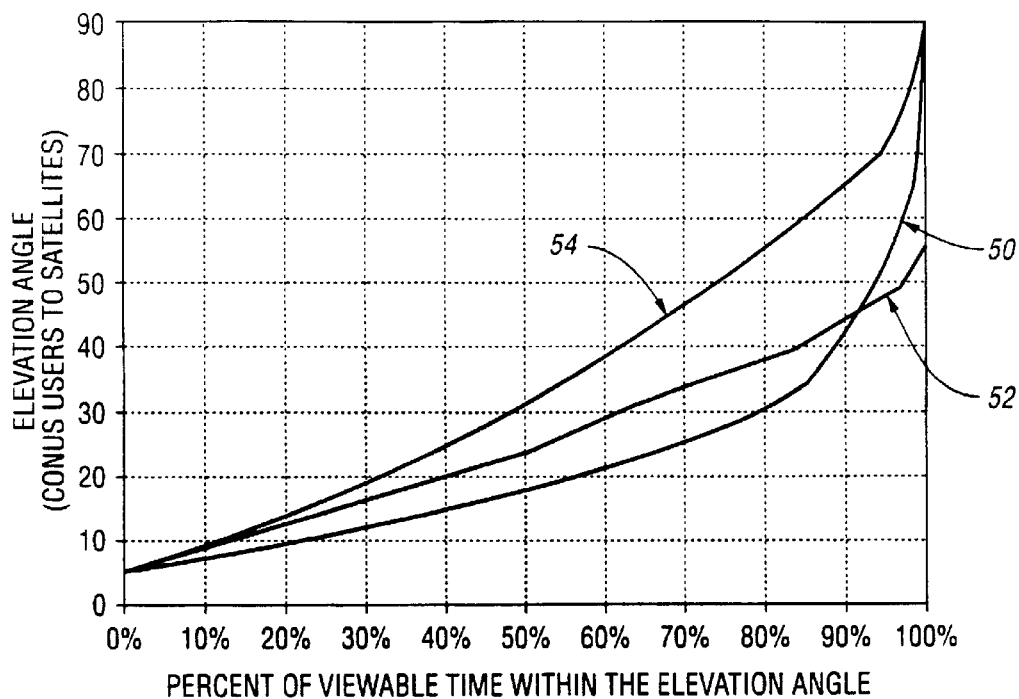
FIG. 6 is a plot of the percent of viewable time of satellite elevation angles from an aviation user to three different classes of orbits.

To improve on such accuracy, the present invention adds augmentation satellites to modify the combined GPS plus augmentation satellite geometry as seen from the user's point of view. Improved vertical accuracies require at least one satellite to be nearly overhead at a high elevation angle along with a distribution of satellites down to lower elevation angles. FIG. 6 shows that on average, orbital satellites spend only a limited amount of time high overhead. In FIG. 6, each curve shows the average elevation angle from users over the continental United States of America to a satellite in a particular orbit versus the percent of viewable time that satellite is at or below that elevation angle. Note that the low earth orbit (LEO) satellites 50 and geostationary earth orbit (GEO) satellites 52 spend approximately 90 percent of their viewable time at elevation angles of 45 degrees or less with respect to the users. The elevation angles of satellites in medium earth orbit (MEO) (having a 55 degrees inclination and 12 sidereal period) are consistently above those of the GEO and LEO satellites. In FIG. 6, the MEO satellites are at an elevation angle of 45 degrees or less 54 only 68% of the time.

The present invention takes advantage of the high elevation angle times offered by the medium earth orbits. In practice though, not all MEO orbits provide the necessary improvements in vertical accuracy. At inclination angles of less than 35 degrees for posigrade orbits (145 degrees for retrograde orbits), the elevation angle between users at high latitudes and the satellites diminishes. As the inclination angle increases away from the equator, availability of increased elevation angles to the user also increases producing favorable VDOP. However, as the inclination angle increases beyond 75 degrees for posigrade orbits (105 degrees for retrograde orbits) the availability of high elevation angle producing satellites becomes over populated. This has a diminishing effect of producing an over abundance of high elevation angle satellites, taking away from some needed lower elevation angle producing satellites, thus producing less favorable VDOP. Thus, in the preferred embodiment, the augmentation satellites are at an inclination angle of 55 degrees, which is centered in the usable range.

To perform the integration process which determines the optimal satellite geometry, it is important for the aviation users to know that the pattern between the GPS satellites and the augmentation satellites repeats periodically. When the pattern repeats, the integration process can take into account the VDOP over the entire period. Where the GPS and augmentation satellite patterns do not repeat, the VDOP can only be determined for the duration chosen for the integration process. After the duration of the initial alignment has ended, the combined GPS and augmentation satellite geometry would vary unpredictably, resulting in uncertain geometries, producing uncertain accuracy.

The present invention uses the existing GPS satellite geometry with its 12 sidereal hour orbits. No modifications are required to the GPS orbits. To synchronize with the GPS orbits, all of the augmentation satellites may be placed in either 3, 4 or 6 sidereal hour orbits so that the GPS and augmentation satellite patterns repeat every one-half sidereal day, 8 sidereal hour orbits so that the patterns repeat once every sidereal day, 16 sidereal hour orbits so that the patterns repeat once every two sidereal days, or, in the preferred embodiment, in 12 sidereal hour orbits so that the patterns repeat every one-half sidereal day.

The number of augmentation satellites are driven by the mission requirements of the user. Where the satellites are required to provide the primary means of aviation en-route navigation, and an alternate backup system exists, then as few as six augmentation satellites are required to provide global coverage. When the 7.6 meter vertical accuracy of a Category I precision approach is take into account, then empirical sampling of candidate geometries has shown that the minimum number of augmentation satellites increases to twelve. Additional augmentation satellites can be orbited to further improve the navigation accuracy and provide tolerance to satellite outages.

Figure 7:
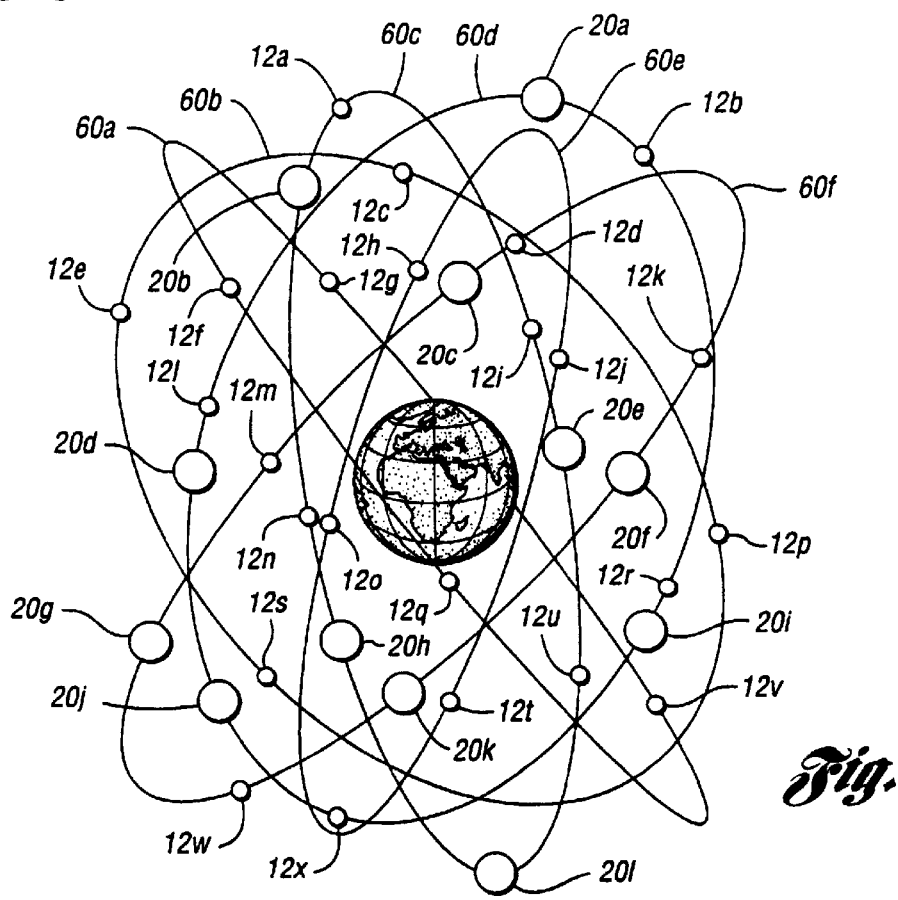
FIG. 7 is an illustration from space of the orbit and satellite positions of the Global Positioning System satellites and the augmentation satellites in the preferred embodiment of the present invention.

The preferred embodiment uses the minimum number of satellites necessary to provide a vertical accuracy of at least 7.6 meters on a global basis. To achieve this, the augmentation satellites have 55 degree inclination angles with twelve sidereal hour orbits and circular orbits to produce a constant geometry between the augmentation satellites and the GPS satellites. Placement of the augmentation satellites within these orbits is achieved using a simulated annealing optimization process described by Aarts and Korst in "Simulated Annealing and Boltzmann Machines, A Stochastic Approach to Combinatorial Optimization and Neural Computing", 1989, which is incorporated herein by reference. Other optimization processes may be used, such as genetic optimization processes or basic numerical integration processes. The optimal positioning places four augmentation satellites into every other orbital plane of the six existing GPS orbital planes for a total of 12 augmentation satellites. FIG. 7 shows a space view of the 24 GPS satellites 12a–12x and 12 augmentation satellites 20a–20l in the 6 orbital planes 60a–60f. At time zero of the 863$^{rd}$ week of the GPS constellation, the 6 GPS orbital planes 60a–60f have right ascension of ascending nodes (RAAN) of 47.500, 107.500, 167.500, 227.500, 287.500 and 347.500 degrees. The RAAN's and the mean anomalies for the preferred placement of the augmentation satellites 20a20l, as measured at time zero of the 863$^{rd}$ week of the GPS constellation, are given in Table 1:

TABLE I

| Augmentation Satellite No. | RAAN (Degrees) | Mean Anomaly (Degrees) |
|---|---|---|
| 1 | 47.500 | 44.094 |
| 2 | 47.500 | 76.150 |
| 3 | 47.500 | 216.506 |
| 4 | 47.500 | 310.375 |
| 5 | 167.500 | 13.721 |
| 6 | 167.500 | 153.873 |
| 7 | 167.500 | 207.051 |
| 8 | 167.500 | 305.780 |
| 9 | 287.500 | 8.615 |
| 10 | 287.500 | 75.115 |
| 11 | 287.500 | 159.485 |
| 12 | 287.500 | 260.057 |

As is readily apparent from Table 1, in the preferred embodiment, four augmentation satellites 20a–20l reside in three (every other) of the six orbital planes 60a–60f used for the GPS. An alternative embodiment exists with four augmentation satellites 20a–20l placed in each of the three orbital planes 60a–60f having RAAN's of 107.500, 227.500, and 347.500 degrees. In this embodiment one skilled in the art will understand that the mean anomalies are shifted to account for the slight differences in the placement of the GPS satellites in the different orbital planes 60a–60f.

Figure 8:
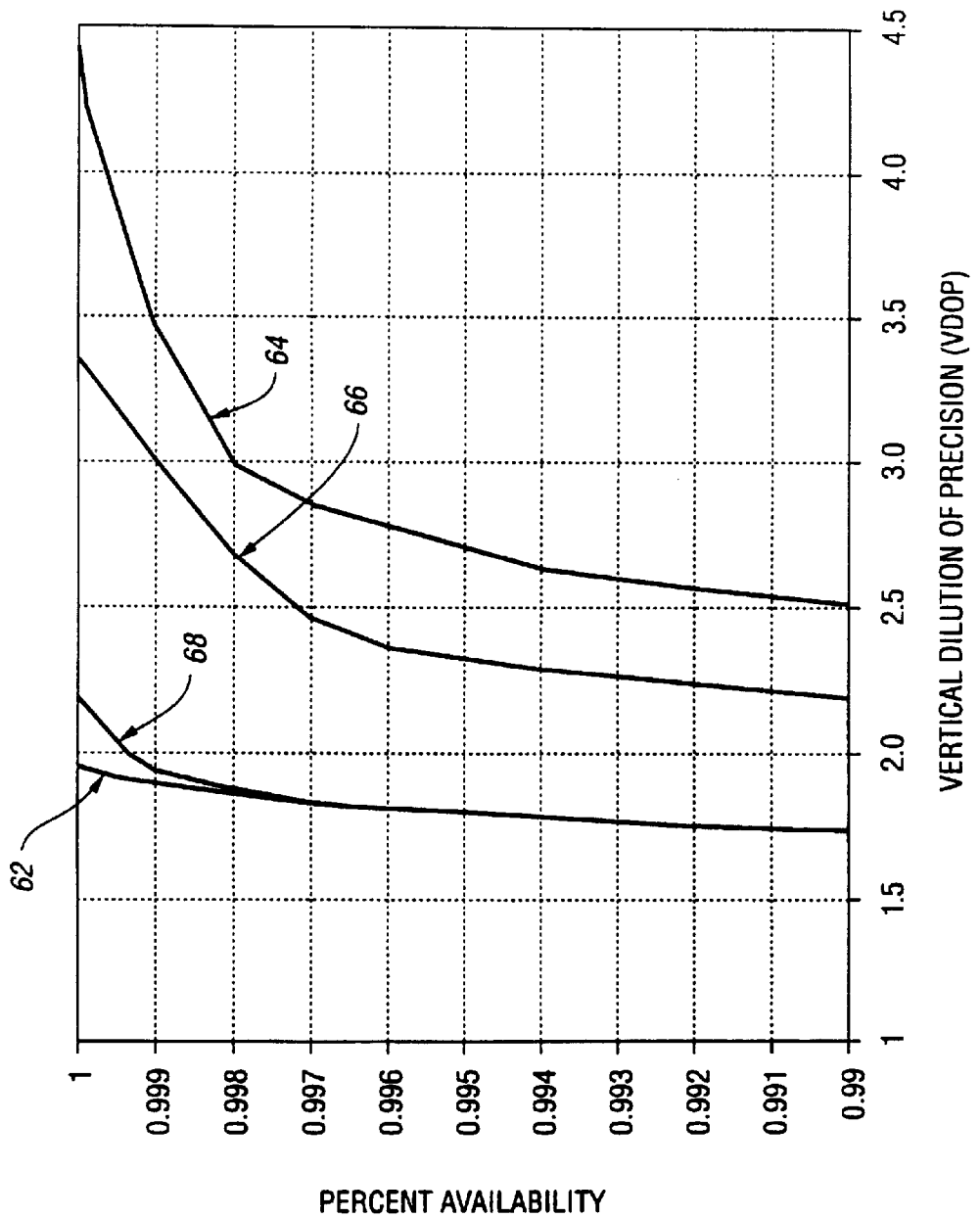
FIG. 8 is a plot of the percent availability of the augmentation satellite constellation of the present invention compared to other constellations.

FIG. 8 shows the resulting VDOP 62 for the preferred embodiment. Also shown for comparison are the VDOP's for the existing GPS constellation by itself 64, the GPS plus two INMARSATS (Atlantic Ocean Region—West and Pacific Ocean Region) satellites 66 as measured within the continental United States (CONUS) of the United States of America National Airspace System (U.S. NAS), and the GPS plus the two INMARSATS and four additional GEO satellites 68 also as measured from the CONUS. One significant difference between the preferred augmentation of the present invention and the six GEO satellite augmentation is that the six GEO satellite augmentation improves the VDOP in the U.S. NAS only, benefitting only the U.S. airspace, while the preferred embodiment improves the VDOP globally, benefitting all airspaces.

As is readily apparent, the present invention describes an augmentation system which maximizes the vertical accuracy without disturbing or requiring repositioning of the existing GPS constellation. This is in contrast to the augmentation described by Spilker which includes rearranging the existing GPS constellation to maximize the number of satellites in view. More specifically, the present invention inserts the augmentation satellites into orbital slots in-between the existing GPS satellites in order to minimize times when the elevation angle from a user to either a GPS satellite or an augmentation satellite is low, and thus maximize the vertical accuracy. The GPS augmentation described by Spilker would reposition the existing GPS satellites so that from the user's point of view there would always be at least eight satellites somewhere above the horizon. Moreover, the present invention places the augmentation satellites in every other orbit, again to maximize the vertical accuracy. The approach described by Spilker places the augmentation satellites into all six existing orbits in order to maintain maximum geometric symmetry so as to minimize the effects of a single satellite outage. Finally, the present invention orbits the minimum twelve augmentation satellites necessary to meet the Category I precision approach vertical accuracy requirement. The approach described by Spilker orbits only six augmentation satellites, which is insufficient to meet the vertical accuracy requirements.

The process used to optimize the accuracy globally can also be used to optimize the augmentation satellite geometry for a specific geographic region or regions of interest. In addition, the orbits of the augmentation satellites can be made elliptical in order to increase the time during which they appear over the regions of interest. The present invention preferably limits the eccentricity of such elliptical orbits to less than 0.5. In so doing, the augmentation satellites remain essentially in medium earth orbit with perigees near 10,000 kilometers, and apogees below geostationary orbit. Highly elliptical orbits with eccentricities above 0.5 can result in apogees beyond geostationary orbits and increase problems associated with doppler shifts in the navigation signals. In order to have the augmentation satellites pass repeatedly over a geographical region of interest, they are placed in orbital planes with an inclination angle of 63.4 or 116.6 degrees. Orbital planes with inclination angles of 63.4 degrees are preferred over inclination angles of 116.6 since the satellites in 63.4 degree inclinations move in the same direction that the earth is rotating and thus appear to move slower across the sky as seen from the earth. In addition, it takes less booster/launch vehicle energy to reach a 63.4 degree inclined orbit than a 116.6 degree inclined orbit.

Figure 9:
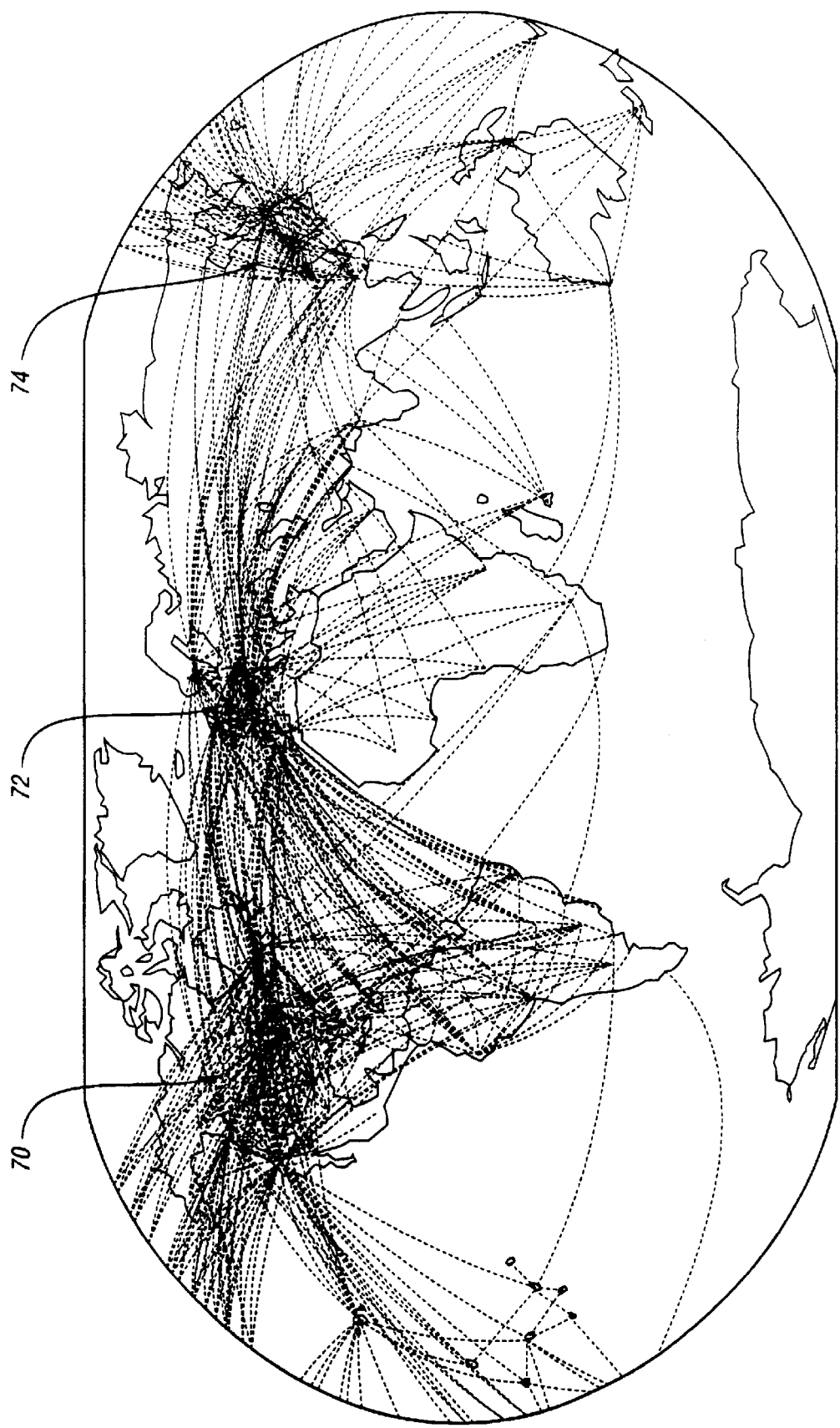
FIG. 9 is an illustration of the flight paths of commercial aircraft over an average one day period in 1997.
Figure 10:
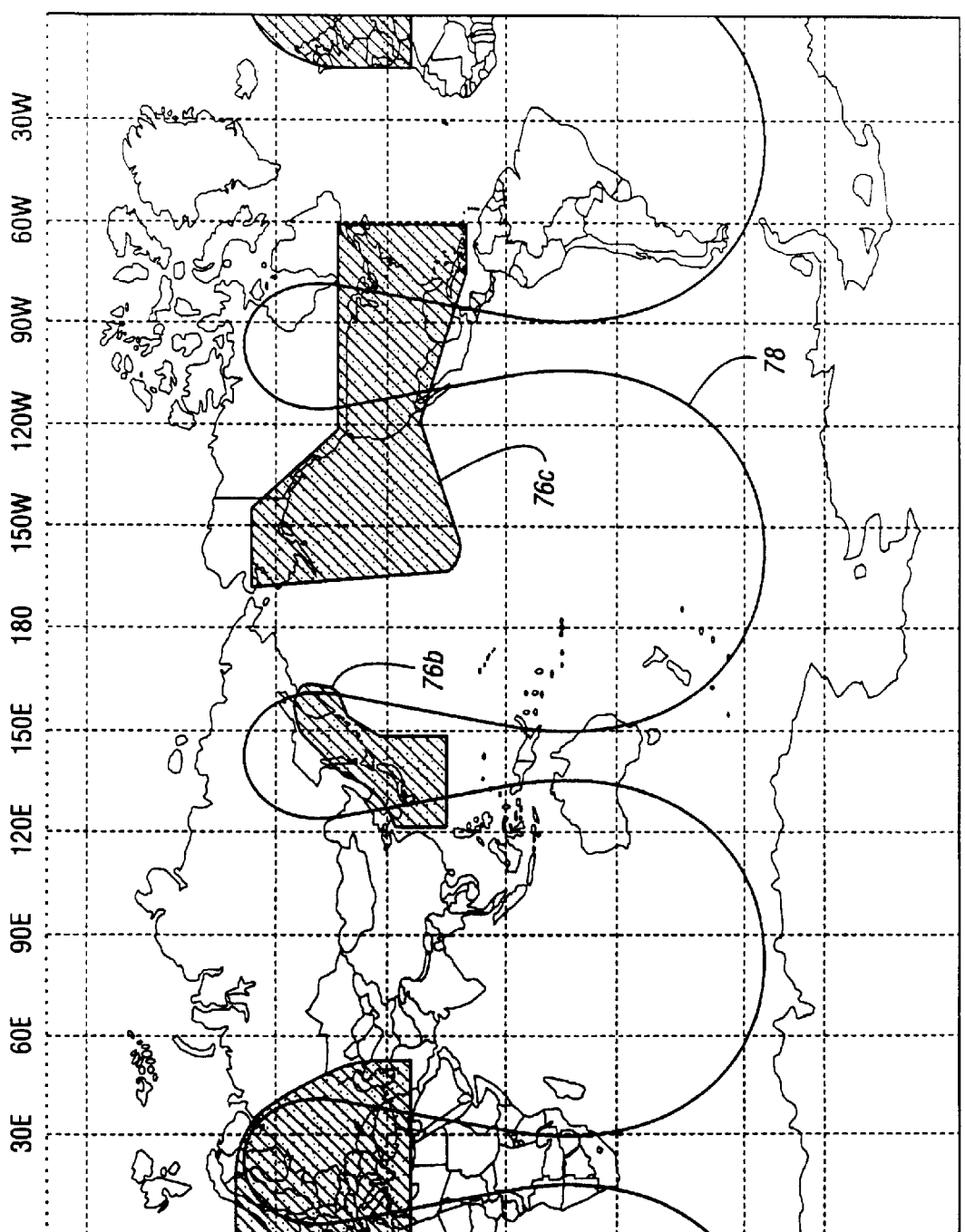
FIG. 10 is a ground trace of an augmentation satellite in a 16 sidereal hour elliptical orbit shown for a duration of two days.
Figure 11:
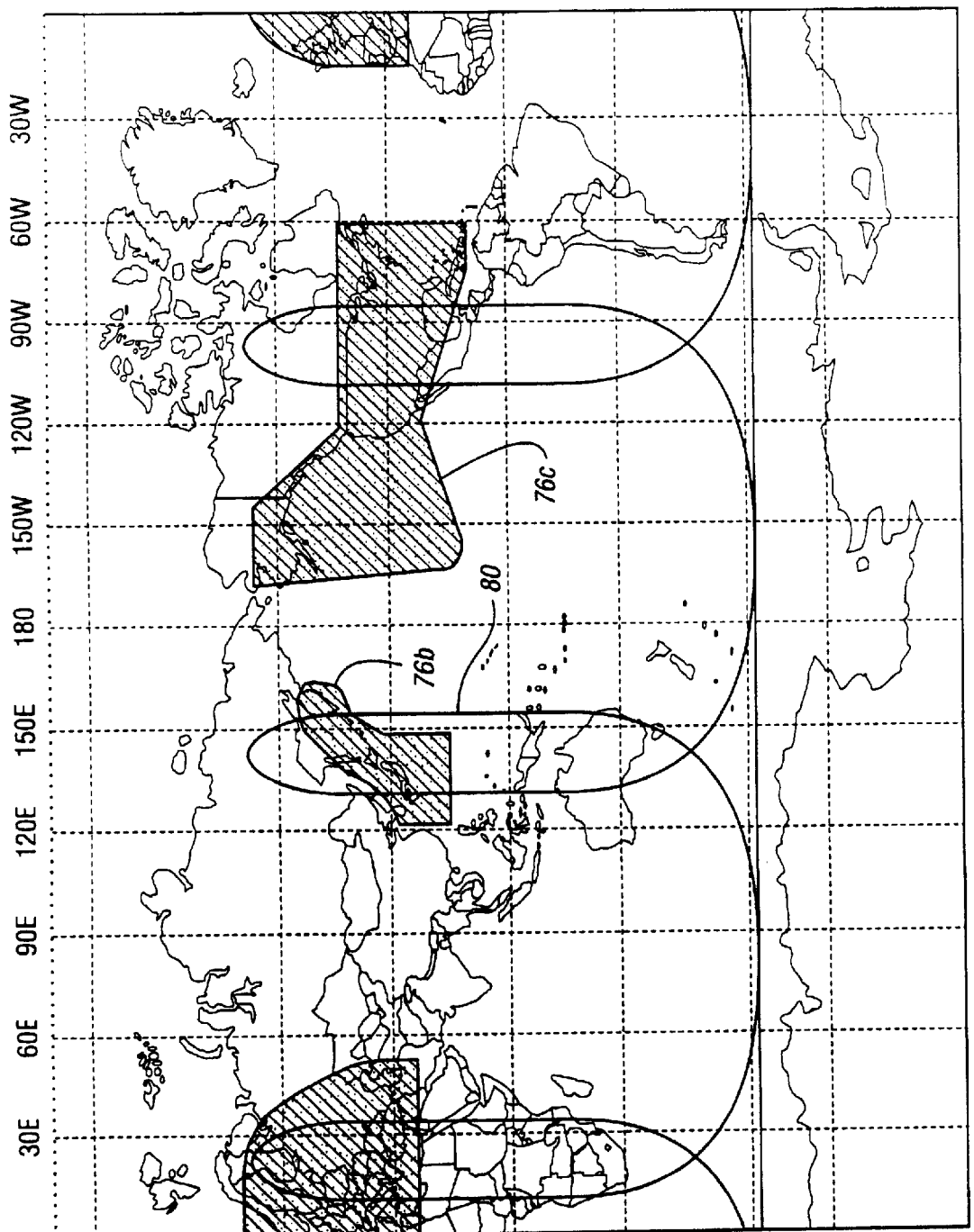
FIG. 11 is a ground trace of an augmentation satellite in an 8 sidereal hour elliptical orbit.

In another embodiment of the present invention, elliptical orbits are used to provide preferential coverage to the areas of the earth that have the highest air traffic density. FIG. 9 shows the Official Airline Guide air traffic density plot of flights over a typical one day period in the year 1997. The three areas of highest air traffic density are the continental U.S. 70, Eastern Europe 72, and Eastern Asia-Japan 74. These three geographic areas are separated by approximately 120 degrees longitude and are shown in FIG. 10 along with a definition of the three air spaces 76a–76c. According to this alternative embodiment of the present invention, all three of these regions are covered with the augmentation satellites in elliptical orbits of eight or sixteen sidereal hour periods, with an inclination angle of 63.4 degrees, and with apogees centered over approximately 63 degrees North latitude and approximately 20 degrees East longitude (for Eastern Europe), 140 degrees East longitude (for Eastern Asia and Japan) and 100 degrees West longitude (for the continental United States of America). FIG. 10 illustrates a 16 sidereal hour orbit ground track 78 that is synchronized to these three air spaces. FIG. 11 illustrates an 8 sidereal hour orbit ground track 80 also synchronized to these three air spaces. The distribution of the augmentation satellites within the elliptical orbits are optimized according to the simulated annealing process previously referenced to maximize the vertical accuracy over these three regions.

Although multiple embodiments of the invention have been shown and described it will be understood by those skilled in the art that many possible variations can be made without departing from the scope of this invention. This invention is not to be limited by the specific embodiments, rather it is defined in the following claims.

What is claimed is:

1. A satellite navigation system for improving overall navigation accuracythe system designed for use with a global positioning system having 24 satellites in six orbital planes at 55 degrees inclination, 12 sidereal hour periods, and right ascension of the ascending nodes offset from each other by 60 degrees, the satellite navigation system comprising:

at least 12 satellites residing in a plurality of medium earth orbits, each of the plurality of orbits having a period of at least 3 sidereal hours and less than one sidereal day, and an inclination angle selected from the group consisting of angles between 35 and 75 degrees and angles between 105 and 145 degrees, each of the at least 12 satellites positioned within the plurality of orbits at sufficient elevation angles to a user such that a vertical navigation accuracy provided by the system is at least approximately 7.6 meters with at least approximately 99.9% availability; and means for transmitting a navigation signal to the user carried by each of the at least 12 satellites.

2. The system of claim 1 wherein all of the periods are identical and are selected from the group consisting of 16, 12, 8, 6, 4, and 3 sidereal hours.

3. The system of claim 2 further designed for use with a ground based monitoring system including a plurality of reference stations for monitoring the navigation signals of all of the satellites, a monitor station for processing the navigation signals relayed from the reference stations to generate correction data, and a ground uplink station for transmitting the correction data to the at least 12 satellites, the satellite navigation system further comprising:

a receiver for receiving the correction data substantially continuously from the ground based monitoring system carried by each of the at least 12 satellites, and means for transmitting the correction data substantially continuously to the user carried by each of the at least 12 satellites.

4. The system of claim 3 wherein a first, a second, a third and a fourth of the at least 12 satellites reside in a first of the plurality of orbits having a right ascension of ascending node of approximately 47 degrees, a fifth, a sixth, a seventh and an eighth of the at least 12 satellites reside in a second of the plurality of orbits having a right ascension of ascending node of approximately 167 degrees, and a ninth, a tenth, an eleventh and a twelfth of the at least 12 satellites reside in a third of the plurality of orbits having a right ascension of ascending node of approximately 287 degrees, all of the plurality of orbits having a period of 12 sidereal hours, an inclination angle of 55 degrees, and an eccentricity of zero.

5. The system of claim 4 wherein the first, second, third, fourth, fifth, sixth, seventh, eighth, ninth, tenth, eleventh and twelfth of the at least 12 satellites have a mean anomaly of approximately 44, 76, 217, 310, 14, 154, 207, 306, 9, 75, 159 and 260 degrees respectively as measured at a time zero of an $863^{rd}$ week of existence of the global positioning system.

6. The system of claim 3 wherein all of the inclination angles are identical and are selected from the group consisting of 63.4 and 116.6 degrees, all of the plurality of orbits have an identical eccentricity of less than 0.5, and all of the plurality of orbits reach an apogee over global positions selected to provide the vertical accuracy in a geographical region of interest.

7. The system of claim 6 wherein the at least 12 satellites reside in at least 12 orbits, all of the at least 12 orbits having an inclination angle of 63.4 degrees, a period of 8 sidereal hours, and reaching an apogee over approximately 63 degrees North latitude and approximately 20 degrees East longitude, approximately 63 degrees North latitude and approximately 140 East longitude, and approximately 63 degrees North latitude and approximately 100 degrees West longitude.

8. The system of claim 6 wherein the at least 12 satellites reside in at least 12 orbits, all of the at least 12 orbits having an inclination angle of 63.4 degrees, a period of 16 sidereal hours, and reaching an apogee over approximately 63 degrees North latitude and approximately 20 degrees East longitude, approximately 63 degrees North latitude and approximately 140 East longitude, and approximately 63 degrees North latitude and approximately 100 degrees West longitude.

9. A method for improving overall satellite navigation accuracy, the method being designed for use with a global positioning system having 24 satellites in six orbital planes at 55 degrees inclination, 12 sidereal hour periods, and right ascension of ascending nodes offset from each other by 60 degrees the method comprising:

placing at least 12 satellites into a plurality of medium earth orbits, each of the plurality of orbits having a period of at least 3 sidereal hours and less than one sidereal day, and an inclination angle selected from the group consisting of angles between 35 and 75 degrees and angles between 105 and 145 degrees, each of the at least 12 satellites positioned within the plurality of orbits at sufficient elevation angles to a user such that a vertical navigation accuracy provided by the system is at least approximately 7.6 meters with at least approximately 99.9% availability; and transmitting a navigation signal from each of the at least 12 satellites to the user.

10. The method of claim 9 wherein all of the periods are identical and are selected from the group consisting of 16, 12, 8, 6, 4, and 3 sidereal hours.

11. The method of claim 10 further designed for use with a ground based monitoring system including a plurality of reference stations for monitoring the navigation signals of all of the satellites, a monitor station for processing the navigation signals relayed from the reference stations to generate correction data, and a ground uplink station for transmitting the correction data to the at least 12 satellites, the satellite navigation system further comprising:

receiving the correction data substantially continuously from the ground based monitoring system at each of the at least 12 satellites; and transmitting the correction data substantially continuously from each of the at least 12 satellites to the user.

12. The method of claim 11 wherein a first, a second, a third and a fourth of the at least 12 satellites are placed in a first of the plurality of orbits having a right ascension of ascending node of approximately 47 degrees, a fifth, a sixth, a seventh and an eighth of the at least 12 satellites are placed in a second of the plurality of orbits having a right ascension of ascending node of approximately 167 degrees, and a ninth, a tenth, an eleventh and a twelfth of the at least 12 satellites are placed in a third of the plurality of orbits having a right ascension of ascending node of approximately 287 degrees, all of the plurality of orbits having a period of 12 sidereal hours, an inclination angle of 55 degrees, and an eccentricity of zero.

13. The method of claim 12 wherein the first, second, third, fourth, fifth, sixth, seventh, eighth, ninth, tenth, eleventh and twelfth of the at least 12 satellites have a mean anomaly of approximately 44, 76, 217, 310. 14, 154, 207. 306, 9, 75, 159 and 260 degrees respectively as measured at a time zero of an $863^{rd}$ week of existence of the global positioning system.

14. The method as in claim 11, wherein all of the inclination angles are identical and are selected from the group consisting of 63.4 and 116.6 degrees, all of the plurality of orbits have an identical eccentricity of less than 0.5, and all of the plurality of orbits reach an apogee over global positions selected to provide the vertical accuracy in a geographical region of interest.

15. The method as in claim 14 wherein the at least 12 satellites are placed in at least 12 orbits, all of the at least 12 orbits having an inclination angle of 63.4 degrees, a period of 8 sidereal hours, and reaching an apogee over approximately 63 degrees North latitude and approximately 20 degrees East longitude, approximately 63 degrees North latitude and approximately 140 East longitude, and approximately 63 degrees North latitude and approximately 100 degrees West longitude.

16. The method as in claim 14 wherein the at least 12 satellites are placed in at least 12 orbits, all of the at least 12 orbits having an inclination angle of 63.4 degrees, a period of 16 sidereal hours, and reaching an apogee over approximately 63 degrees North latitude and approximately 20 degrees East longitude, approximately 63 degrees North latitude and approximately 140 East longitude, and approximately 63 degrees North latitude and approximately 100 degrees West longitude.

* * * * *

UNITED STATES PATENT AND TRADEMARK OFFICE
CERTIFICATE OF CORRECTION

PATENT NO. : 6,182,927 B1
DATED : February 6, 2001
INVENTOR(S) : Dennis M. Galvin It is certified that error appears in the above-identified patent and that said Letters Patent is hereby corrected as shown below:

Column 9, claim 1,
Line 60, delete "accuracythe" and insert -- accuracy, the --.

Signed and Sealed this

Sixth Day of November, 2001

Attest:

NICHOLAS P. GODICI
*Attesting Officer*    *Acting Director of the United States Patent and Trademark Office*